(12) United States Patent
Funk

(10) Patent No.: US 7,534,280 B2
(45) Date of Patent: May 19, 2009

(54) FERTILIZERS CONTAINING POLYAMINO ACID

(75) Inventor: Roger Funk, Streetsboro, OH (US)

(73) Assignee: The Davey Tree Expert Company, Kent, OH (US)

( * ) Notice: Subject to any disclaimer, the term of this patent is extended or adjusted under 35 U.S.C. 154(b) by 263 days.

(21) Appl. No.: 11/516,810

(22) Filed: Sep. 6, 2006

(65) Prior Publication Data

US 2007/0051149 A1 Mar. 8, 2007

Related U.S. Application Data

(63) Continuation-in-part of application No. 11/113,489, filed on Apr. 25, 2005.

(51) Int. Cl.
C05C 9/02 (2006.01)
(52) U.S. Cl. ........................ 71/29; 71/27; 71/28; 71/30; 71/64.1
(58) Field of Classification Search ................ 71/27, 71/28, 29, 30, 64.1
See application file for complete search history.

(56) References Cited

U.S. PATENT DOCUMENTS

| | | | |
|---|---|---|---|
| 3,231,363 A | 1/1966 | Renner | |
| 3,479,175 A | 11/1969 | Murphy, Jr. et al. | |
| 3,705,794 A | 12/1972 | Czurak et al. | |
| 4,036,627 A | 7/1977 | Funk | |
| 4,089,670 A | 5/1978 | Funk | |
| 4,173,582 A | 11/1979 | Greidinger et al. | |
| 4,238,072 A | 12/1980 | Licursi | |
| 4,378,238 A | 3/1983 | Goertz | |
| RE31,801 E | 1/1985 | Moore, Jr. | |
| 4,596,593 A | 6/1986 | Tazawa et al. | |
| 4,839,461 A | 6/1989 | Boehmke | |
| 5,174,805 A | 12/1992 | Masuda | |
| 5,308,373 A | 5/1994 | Moore | |
| 5,350,735 A | 9/1994 | Kinnersley et al. | |
| 5,411,568 A | 5/1995 | Moore | |
| 5,502,117 A | 3/1996 | Wood | |
| 5,593,947 A | 1/1997 | Kinnersley et al. | |
| 5,597,400 A | 1/1997 | Nonomura et al. | |
| 5,661,103 A | 8/1997 | Harms et al. | |
| 5,814,582 A | 9/1998 | Koskan et al. | |
| 5,859,149 A | 1/1999 | Martin | |
| 5,861,356 A | 1/1999 | Koskan et al. | |
| 5,935,909 A | 8/1999 | Sanders | |
| 6,184,336 B1 | 2/2001 | Tang | |
| 6,254,655 B1 | 7/2001 | Goertz | |
| 6,309,440 B1 | 10/2001 | Yamashita | |
| 6,380,350 B1 | 4/2002 | Mukouyama et al. | |
| 6,432,156 B1 | 8/2002 | O'Donnell, Sr. | |
| 6,562,941 B2 | 5/2003 | Ma | |
| 6,936,681 B1 | 8/2005 | Wertz et al. | |
| 2002/0055613 A1 | 5/2002 | Ma | |
| 2002/0129544 A1 | 9/2002 | Bargiacchi et al. | |
| 2003/0224936 A1 | 12/2003 | Kretzschmar | |
| 2004/0035162 A1 | 2/2004 | Williams et al. | |
| 2006/0236734 A1 | 10/2006 | Funk | |

FOREIGN PATENT DOCUMENTS

| | | |
|---|---|---|
| CN | 1386725 | 12/2002 |
| CN | 1454879 | 11/2003 |
| CN | 1491924 | 4/2004 |
| DE | 10008738 | 8/2001 |
| JP | 2000-178091 | 6/2000 |
| SU | 922102 | 4/1982 |
| WO | 94/09628 | 5/1994 |
| WO | 98/30100 | 7/1998 |
| WO | 99/63819 | 12/1999 |
| WO | 2006/115758 | 11/2006 |

OTHER PUBLICATIONS

Funk, R. "2004 Fertilizer Screening Study" This document is provided for informational purposes only.
Web page entitled "Biopolymer Products," by NanoChem Solutions Inc. (date of first publication unknown).
Roche, J., "What's a true soil amendment?" *Landscape & Irrigation* (Sep. 2004).
"Amino Acids," *NOSB Materials Database* (Nov. 1999).
Database CA [On Line] Chemical Abstracts Service, Columbus, Ohio, US Wu, Shanghui et al.: "Slow—release urea containing polyaspartic acid or its salt, its preparation and application" XP002409552 retrieved from STN Database Accession No. 144:411781 Abstract & CN 1 733 655 CN (Beijing Tianyin Aishihua Science and Technology Co., Ltd., Peop. Rep.) Jan. 2004.
Database CA [On Line]Chemical Abstracts Service, Columbus, Ohio, US Hori, Katsuya: "Manufacture of fertilizer containing organic solution" XP002409553 retrieved from STN Database Accession No. 133:58232 Abstract & JP 2000 178091 A2 (Daito K.K., Japan) Jun. 27, 2000.
Narsavage-Heald, D., "Thermal Polyaspartate as a Biodegradable Alternative to Polyacrylate and other Currently Used Water Soluble Polymers" (date of first publication unknown).
Nita, L.E. et al. "Possibilities for poly(aspartic acid) preparation as biodegradable compound," Journal of Optoelectronics and Advanced Materials, vol. 8, No. 2, pp. 663-666 (Apr. 2006).
"Amino Acids," NOSB Materials Database, pp. 1-9 (Nov. 29, 1999).
International Preliminary Report on Patentability issued regarding International Application No. PCT/US2006/013353 (Oct. 30, 2007).
International Search Report and Written Opion regarding International Application No. PCT/US2007/077576 (May 28, 2008).

*Primary Examiner*—Wayne Langel
(74) *Attorney, Agent, or Firm*—Thompson Hine LLP

(57) ABSTRACT

High analysis fertilizer formulations of a low bulk density powdered ureaformaldehyde, having soluble and insoluble components combined with soluble monopotassium phosphate and polyamino acid in which the resulting mixtures are dry homogeneous blends and may be carried in liquid for application to surface or subsurface areas by conventional liquid fertilizer applying equipment.

6 Claims, No Drawings

FERTILIZERS CONTAINING POLYAMINO ACID

CROSS REFERENCE TO RELATED APPLICATION

This application is a continuation-in-part of U.S. application Ser. No. 11/113,489, filed Apr. 25, 2005, the contents of which are hereby incorporated by reference.

BACKGROUND OF THE INVENTION

This invention relates generally to fertilizer mixtures of synthetic organic and inorganic materials and particularly to formulations containing monopotassium phosphate, ureaformaldehyde and a polyamino acid to form dry homogeneous, low burn, high analysis fertilizers which may be carried in liquid for application in surface and subsurface spraying and injection fertilization.

The use of fertilizer blends of both organic and inorganic material has become recognized as being advantageous in many fertilizer applications. Such blends not only supply nutrients which may be immediately absorbed into the plant root system, but also provide a source of long-term nutrient supply.

In order for any nutrient material to be absorbed by a plant root system, it must be dissolved to create various ion structures or salts which are readily attracted and absorbed into the root tissue by an ion exchange process. The conventional inorganic fertilizer material which may include phosphates and potassium is soluble in water and forms ions readily when dissolved. Therefore when such fertilizers are supplied to the soil in liquid form, the nutrient ions or salts are immediately available for absorption, or, if dry inorganic fertilizers are used, the nutrient ions or salts become available as water is percolated through the soil.

Various organic fertilizers, those structures which include animal, vegetable and synthetic carbon structures, on the other hand, are advantageous in that they exhibit slower rates of decomposition. That is, organic fertilizer material ordinarily is not readily soluble in water, but only breaks down by microorganism action in the soil to release nutrient ions over a period of time and thus a single fertilizer application may supply nutrients for an extended period. Such organic materials are often referred to as slow release fertilizers.

As mentioned above, organic and inorganic fertilizers may be supplied in either soluble or insoluble form and may either be spread or sprayed onto surface areas or injected or otherwise supplied to subsurface areas. However, when using readily soluble fertilizers, one is limited to the amount of nutrients which may be effectively supplied to the soil without causing damage to plant tissues, a problem commonly referred to as plant or root burn. As the nutrients of the soluble fertilizer are readily dissolved for plant absorption, an excessive amount of salt concentration due to the number of ions released adjacent the root system, may suppress the water absorption by the roots and in some cases may extract moisture from the plant causing the plant to be subjected to a moisture deficiency. However, various fertilizer nutrients are less likely to cause root burn even when in a soluble state. Generally, the potential for causing root burn is determined by the salt index of the particular nutrient, as the greater the salt index, the greater the ion concentration in the soil. Often fertilizers contain significant quantities of high salt index ingredients which, although containing necessary nutrients, may be harmful if supplied in excessive quantities.

Insoluble fertilizers, on the other hand, must be broken down by either chemical or biodegradable action and thus the rate of salt supply may be reduced somewhat depending upon climatic and soil conditions. Also, many insoluble fertilizers having particulate material of a size to be readily blended with soluble material are generally not readily adaptable to the presently increasing use of pressure or hydraulic fertilizer injection techniques since the particle sizes of the insoluble material are not small enough to allow the fertilizer material to be injected through small-bore nozzles. In addition, soluble fertilizers readily disperse throughout the root zone with hydraulic soil injection. However, insoluble fertilizer must be ground to a particulate size small enough that it is not filtered out by the soil particles, much like sand filters out insoluble particles in a swimming pool. Otherwise, the fertilizer remains at the injection site, limiting root contact.

The possibility of root burn is further increased if high analysis fertilizers are used since a greater concentration of available nutrient ions are present. High analysis fertilizer compositions are generally viewed as those in which the total percent of the nitrogen is equal to or exceeds 20% of the overall fertilizer weight and the total percent of the nitrogen, potassium and phosphate nutrients is at least 40% of the fertilizer weight.

The use of high analysis fertilizers is often desirable for several reasons. Not only will the nutrients be supplied to the consumer in less bulk, but the amount of nutrients applied per surface or subsurface applications may be significantly increased. Again, however, as the concentration of nutrient ions is increased, the danger of root burn also increases.

In addition to their burn potential, all nutrient salts or ions are subject to leaching as water dissolves minute quantities of the fertilizer material. Such dissolved material usually moves with the water and leaches away from the area of the roots. However, all nutrients do not leach to the same degree. As an example, nitrate salts (the form of nitrogen primarily absorbed by plant roots) move with ground water and rapidly leach from the root zone while potassium is moderately leached and only a trace of phosphorus is lost. Therefore, in order to insure that a source of nitrogen is maintained in the soil, an insoluble nitrogen could be used to reduce ion loss due to leaching.

Subsurface application of fertilizers is recognized as being a highly desirable method by which to provide for the efficient and effective feeding and caring of trees, shrubs and lawns by supplying nutrients directly to the area of the plant roots. Such application has the added advantage, over surface fertilizing, of decreasing the amount of fertilizer runoff or leaching caused by the action of surface waters.

In this regard, there are generally two widely accepted methods by which fertilizers may be supplied to subsurface areas. These methods include subsurface treatment with a dry fertilizer using drill or bore hole application techniques, and the subsurface injection of a liquid type fertilizer using injection apparatus.

There are, however, particular problems associated with the subsurface application of fertilizers in either dry or liquid form, especially when considering possible plant damage, economics and labor requirements. Thus, the objective of any fertilization process is the application to the soil of an optimum quantity of various macro and/or micro nutrients to insure the proper ratio and amounts of nutrient ions necessary for plant growth and nourishment in such a manner that expenses and application time are maintained at a minimum.

Liquid injection usually is desirable over dry bore hole methods because a subsurface application of fertilizer may be made in less time and therefore at a significant reduction in total man hours. Also, the liquid injection technique disperses nutrients throughout the root area increasing root contact and, thus, absorption by the plant. Dry fertilizer in vertical holes does not disperse laterally, providing only "spot" treatments of supplemental nutrients. However, most liquid fertilizers utilize soluble nutrients which if applied at the recommended nutrient level would cause root burn as an excessive amount of ions would be present in the soil immediately after the application, thereby leading to the depletion of the root water supply, as previously discussed. In practice, therefore, liquid injection techniques have necessitated a reduction in the amount of available nutrients supplied per application. For example, if the optimum quantity of a fertilizer nutrient supply is 6 lbs. of nitrogen per 1,000 square feet of root area per year, in practice approximately ½ to 2 lbs. per 1,000 square feet could be applied without fear of damage due to the possible plant or root burn which would be caused if all the nutrients were available in a soluble form.

Bore hole applications of dry fertilizers, on the other hand, permit the use of the generally insoluble or less soluble particulate material. Currently, many dry type fertilizers contain a combination of readily available inorganic and organic nutrients and slow release long chain organic nutrients. If a fertilizer includes a long chain synthetic organic nitrogen supply, the nitrogen is released only after the carbon chain is slowly broken down by chemical and biological reaction as water seeps through the soil. Thus, with a dry fertilizer, the total nutrient supply may be applied in a single application with a significant reduction in the immediately available nutrient ions thereby reducing the possibility of plant or root burn. However, the time and cost of labor to apply dry fertilizer is greater than that of using liquid injection techniques. This is because holes must be bored or drilled around each plant to be fertilized.

Therefore, although subsurface applications of dry fertilizers are advantageous in permitting an increased nutrient supply by way of slow release nitrogen components to reduce burn potential, pressure or hydraulic injection of fertilizers is often preferred as it is a quicker and easier method by which fertilizer may be applied to subsurface areas without the extra work necessitated by more traditional drill or bore hole techniques. Hydraulic injection is also the best method for nutrient dispersal throughout the root zone.

To obtain the joint benefit of liquid injection together with short and long term nutrient release of some dry fertilizers, it is important to provide a mixture of organic and inorganic fertilizer material which, when mixed with water, forms a solution of the inorganic material and a portion of the organic material and forms a suspension of the remainder of the organic material. Normally a dry inorganic material is supplied in granular or pellet form. However, since such material dissolves readily in water, it does not clog hydraulic equipment. On the other hand, granular or pellet sized particles of some insoluble organic material are not suitable for use with hydraulic injection equipment, as the particles do not pass through the openings in conventional subsurface injection equipment. The problem is in providing a uniform blend of dry soluble and insoluble organic and soluble inorganic fertilizer components which can be injected to subsurface areas when in the presence of a liquid carrier.

Further, in mixing dry synthetic organic material such as ureaformaldehyde, or ureaform, as the requisite particle size is decreased, the more the material exhibits an ability to "flow" because of its low bulk density. That is, as the powdery organic particles are mixed with various inorganic materials in granular or pellet form, they tend to readily separate or settle through the mixture and thus the overall blend is not homogeneous or uniformly mixed. Various prior art methods for effectively dry blending insoluble organic material such as ureaform with soluble inorganic materials have necessitated that the insoluble particle size be approximately the same size as the soluble particles and therefore the insoluble material is not suitable for subsurface injection.

Therefore, to provide the market or consumer with a fertilizer having water soluble inorganic material with very fine particulate water insoluble organic material uniformly suspended therein which could be used for subsurface applications, it typically has been necessary to blend the organic and inorganic material in a solution. By wet mixing, the problem associated with dry blending may be avoided, however, shipping, packaging, consumer handling and other such problems are increased due to the necessity that the fertilizer could only be available as a liquid or slurry. Therefore, it would be desirable to dry blend the materials to reduce shipping, packaging and other such costs.

SUMMARY OF THE INVENTION

The present invention relates to fertilizer blends containing one or more polyamino acids. The inclusion of an amino acid enhances the effect of nutrients both in fertilizers and in the soil. Affected nutrients include the macronutrients nitrogen, phosphorus, potassium, calcium and magnesium. Furthermore, amino acids have a chelating effect on micronutrients such as zinc, improving the absorption and transportation inside the plant. Amino acids are fundamental ingredients in the process of protein synthesis and are precursors or activators of phytohormones or growth substances. Amino acids also improve microflora in the soil thereby facilitating the assimilation of nutrients and improving soil structure. The inclusion of amino acids can also increase root branching and root hair development. Moreover, amino acids can directly or indirectly influence the physiological activities of the plant. For example, the application of amino acids before, during and after stress conditions such as high temperatures, drought and pest attack, can help ameliorate stress physiology, thus having a preventing and recovering affect.

The present invention is embodied in dry homogeneous high analysis fertilizer blends containing a polyamino acid. The blends typically contain a powdered synthetic organic fertilizer material which is of a size to pass at least an 40-mesh sieve and which has an approximate ratio in the range of 3:1 to 1:1 of water insoluble to water soluble nitrogen releasing nutrients and combined with a water soluble inorganic monopotassium phosphate in mixtures to form fertilizers having ratios of nitrogen, phosphorus and potassium of approximately 2 to 5 parts nitrogen to 1 part each of phosphorus and potassium, individually. The amounts of phosphorus and potassium may be about the same but do not need to be.

In accordance with one aspect of the invention, dry homogeneous high analysis fertilizer blends are provided which contain the nutrients N, P and K as supplied by the combination of an organic fertilizer such as ureaformaldehyde which has a large percentage of its available nitrogen in a slow release form, an inorganic, water soluble, low salt index fertilizer such as monopotassium phosphate and a polyamino acid which may be handled and shipped as dry materials but which may be mixed with water for use with conventional fertilizer injection and spraying equipment.

In accordance with certain aspects of the invention, high analysis fertilizers are described having both slow release, generally insoluble, and fast release, generally soluble, nitrogen supply in an optimum ratio of about 2:1 respectively which may be applied to subsurface areas.

High analysis fertilizers in accordance with another aspect of the invention contain both organic materials having a substantial amount of nitrogen available in a slow release or generally water insoluble form, inorganic materials having a low fertilizer salt index factor and a polyamino acid so that an increased amount of nutrients may be supplied per application while avoiding the possibility of "burn" damage to plant life.

High analysis fertilizers containing a polyamino acid and having an approximate ideal ratio of about 3:1:1 of nitrogen, phosphate, and potassium, respectively, which can be applied by liquid injection techniques without causing root or plant burn are also described.

Dry fertilizers in accordance with particular aspects of the invention are capable of being mixed with water for use in subsurface injection to provide localized short and long term nutrients to plant root areas.

The present invention also provides long term fertilizers in which the total nutrients available in a single fertilizing application are available over an extended period of time. The fertilizers described herein are particularly useful for promoting health and vigor of woody perennials.

DESCRIPTION OF THE PREFERRED EMBODIMENTS

In accordance with the present invention, a fertilizer composition is provided containing synthetic, organic and inorganic materials and, in particular, fertilizer formulations comprising monopotassium phosphate, ureaformaldehyde and a polyamino acid. The inclusion of a polyamino acid in the fertilizer composition has been found to significantly improve plant performance. Fertilizer compositions in accordance with the present invention typically include between about 0.25% and 2.5% by weight of the polyamino acid and, in accordance with particular embodiments of the invention, the fertilizer composition would contain between about 0.3% to 1.0% polyamino acid. Polyamino acids, useful in the present invention, are described in U.S. Pat. Nos. 5,814,582; 5,861,356; 5,593,947 and 5,935,909, the disclosures of which are hereby incorporated by reference. A particularly useful polyamino acid is polyaspartic acid. A specific example of a polyaspartic acid useful herein is the commercially available product Amisorb® (Donlar Corp.). Other polyamino acids such as polyglutamic acid, polyglycine acid as well as co-polymers and mixtures thereof may also be used in accordance with the present invention.

As previously discussed, high analysis fertilizers are desirable to minimize handling and storage problems by reducing the bulk weight of a fertilizer in that a more concentrated source of nutrients may be supplied per unit weight of material. The problem, however, is that the concentrated nutrient sources increase the possibility of root burn. Therefore, in order to develop an acceptable high analysis fertilizer in which the necessary amounts of nutrients may be supplied for a particular application, the final fertilizer composition should be free of high salt index nutrient sources, or if such sources are present, they should be generally insoluble so as to be slowly released over a period of time.

One of the more widely used or common sources of organic fertilizer material has been the synthetically manufactured product which contains amounts of nitrogen in both water soluble and water insoluble form. Ureaformaldehyde or ureaform is one such fertilizer. This water insoluble nitrogen source is advantageous for use in what may be considered slow release or long term fertilizing. That is, the insoluble nitrogen or components of the ureaformaldehyde form a suspension and not a solution when mixed with water and the nutrient value is therefore not immediately released or made available to plant life upon the application of the fertilizer to soil surfaces or subsurfaces.

The ureaformaldehyde is a mixture of unreacted and methylene ureas. The unreacted ureas are soluble in water and provide a relatively quick release source of nitrogen as compared to the slower release nitrogen of methylene ureas. The difference in the rate of nitrogen release is due to the fact that the methylene ureas are relatively long chain polymers which require bacterial decomposition to break down their structure and release the nitrogen while the short chain unreacted urea is immediately available. The nitrogen salts available from urea, however, have generally high salt indexes and if present in too great a concentration will tend to cause root burn. Furthermore, ureaformaldehyde is believed to be the only slow release nitrogen fertilizer that can be pulverized to a 40 mesh particulate size and retain its slow release qualities. Isobutylidene diurea (IBDU) is a similar synthetic organic, but it releases via the action of water and, thus, its release is affected by the surface to volume ratio.

The term "polyamino acid" as used herein also includes salts of polyamino acids. The counterions of the polyamino acids include, but are not limited to, alkali metals and alkaline earth metals, specifically sodium, potassium, magnesium, calcium, strontium and ammonium cations. The potassium polyaspartate is particularly useful in accordance with certain aspects of the present invention. One benefit associated with the use of the potassium salt is that it provides a lower salt index than sodium. Fertilizer compositions in accordance with certain aspects have a salt index of less than 10.

In order to develop a high analysis, low burn fertilizer which provides an initial nitrogen release, as well as one which provides for extended nitrogen supply, a ureaformaldehyde is selected which supplies between one-half to three-quarters of its available nitrogen in a slow release form and from between one-quarter to one-half as unreacted urea for immediate absorption. Therefore, the slow to fast release nitrogen ratio which is determined by the ratio of methylene ureas to unreacted ureas, should range between 1:1 to 3:1, respectively. The presence of a large percentage of slow release nitrogen insures that the nitrogen salts will not be overly concentrated in the soil at the time of application but will be made available for plant absorption over a period of time. Additionally, the large percentage of slow release nitrogen insures that the nitrogen source does not leach away from the plant roots in a short time.

Although the ratio of slow to fast release nitrogen may vary somewhat, a preferred ureaformaldehyde is selected which supplies approximately two-thirds of its available nitrogen in a slow release form and one-third as unreacted urea which is soluble and therefore available for immediate absorption. By utilizing this 2:1 nitrogen releasing ratio, tests indicate that the breakdown or decomposition of ureaformaldehyde to form soluble nitrogen salts occurs over a period of several years under average soil and moisture conditions. In fact, over a period of the first year, approximately 60% of the insoluble ureaformaldehyde may be decomposed and after several years, amounts of up to 10% of the original nitrogen may still be available for ion release for plant absorption. Therefore, this use of ureaformaldehyde enables the long-term availability of nitrogen by a one-time fertilization process while simultaneously reducing plant burn due to an overly concentrated source of nitrogen salts.

It should be noted that if the ratio of slow to fast release nitrogen is increased to 3:1, the amount of nitrogen immediately available for plant absorption is decreased and the percentage of residual nitrogen release over a 2 year period, as indicated above, is increased and the burn potential further decreased.

Likewise, a slow to fast release nitrogen ratio of 1:1 decreases the effective residual organic material available to provide for long-term nitrogen supplies but makes an increased amount of nitrogen available for immediate plant absorption. However, the concentration of available nitrogen salts is significantly increased and thus the possibility of plant or root burn is more likely. This, again, is particularly true in high analysis fertilizers wherein a substantial amount of nitrogen nutrient sources are available.

To effectively utilize ureaformaldehyde in conventional fertilizer spraying and subsurface injection apparatus, it is also preferable that it be used as a fine powder. The ureaformaldehyde particles should be small enough to pass a standard 40-mesh sieve; however, in accordance with certain embodiments, it is preferred that the major portion of such particles pass a 150-mesh sieve with many passing a 200-mesh sieve, and thus be of a consistency of a fine talc or hydrated lime. The particle size is desirable to permit the insoluble nitrogen sources to pass freely through conventional spray and injection apparatus when suspended in water. Moreover, this particle size is desirable to disperse readily in soil via hydraulic injection.

As previously discussed, to provide a high analysis fertilizer formulation having immediately available inorganic nutrients, the synthetic organic nitrogen releasing material or compound is blended with various inorganic compounds to form fertilizer compositions in which the total percent of the nitrogen is equal to or exceeds 20% and the total percent of the nitrogen, potassium and phosphate nutrients is at least 40% of the overall fertilizer weight.

Ideally, the amounts, ratio, and types of nutrient ions to be applied should be based not only on an individual or species of plant requirements, but also on the presence of nutrients already in the soil. The nutrient compositions of a soil may be determined by various tests, however, it is not always economically feasible to have such tests made for every fertilizer application nor are such testing methods readily available to all consumers. Therefore, it is preferable to supply a fertilizer composition which is formulated to supply nutrients in the proper amounts and in the proper ratios for the plant itself. Further, if the fertilizer is made to contain low salt index salts or ions and/or slow release nutrients such as long chain ureaformaldehyde, the possibility of root or plant burn by an overfeeding is greatly reduced. That is, if various ions are already available in the soil, the addition of a fertilizer having a low salt index inorganic source of phosphorus and potassium, as well as a slow release nitrogen, will be less likely to cause plant damage than other formulations.

In this regard, it has long been known that a preferred ratio of the macro-nutrients, nitrogen, phosphorus and potassium for tree fertilization is in the range of 3:1:1, respectively, based on nutrient uptake and utilization. The amount of fertilizer applied, however, may vary dependent upon the size and type of tree or upon the square foot area defined by the drip line of a particular tree as well as upon the composition of the fertilizer itself. Fertilizers having both the necessary amount of nutrients and an approximate 3:1:1 ratio, allow for the desired promotion of growth in spring and summer by providing readily available nitrogen and also make available an annual supply of the macro-nutrients phosphorus and potassium.

In accordance with certain embodiments of the invention, the desired fertilizer formulation meets the following criteria: First, the fertilizer should provide nutrients in the most advantageous or beneficial preparations to support plant growth and nourishment which for trees is a ratio of nitrogen to phosphorus to potassium of approximately 3:1:1, respectively; second, the fertilizer should be blended using components or nutrient supplies of low burn characteristics; third, the particle size should permit both surface applications and subsurface injection; and fourth, the nitrogen nutrient source should include a significant percentage of slow release nitrogen which reduces burn potential, retards leaching, and provides for extended tree growth.

In order to achieve the desired characteristics, a urea-formaldehyde nitrogen source was selected having both slow and fast release nitrogen components in which the fast release nitrogen was available as a generally soluble unreacted or excess of urea and the slow release nitrogen was available as a generally insoluble long chain methylene urea. In accordance with one aspect of the invention, ureaformaldehyde granules are pulverized to at least 40 mesh. One method for pulverizing the granules to the desired size involves the use of an air hammer (hammer mill).

The advantage of a product produced in this manner is that the size of the insoluble nitrogen releasing components is such that they may pass through conventional sprayer or injection equipment as long as they are maintained in a liquid suspension and not allowed to settle after having been placed in suspension.

In order to complete the fertilizer blend, it was necessary to select a source of phosphorus and potassium which would not be injurious to plants and one which could be dry mixed with the fine particulate nitrogen source. In order to minimize the possibility of "root burn" monopotassium phosphate or monobasic phosphate, $KH_2PO_4$ which has an extremely low salt index, was chosen as the preferred inorganic nutrient source.

In this regard, other potassium phosphates have been considered; however, the monopotassium phosphate is the most desirable potassium phosphate compound for several reasons. First, the monopotassium phosphate has a salt index of 8.4 which is the lowest index of any conventional fertilizer material and thus the lowest burn potential. Second, the monopotassium phosphate is not hygroscopic and does not absorb moisture from the atmosphere, while other sources of potassium phosphate are hygroscopic and therefore are not as acceptable for dry blending. Third, the monopotassium phosphate has the additional advantage of having less effect on soil acidity than other potassium phosphates. Many of the available potassium phosphates are alkaline, having pH's of 9 to 10 or more. Such alkalinity may be undesirable for general tree fertilization. Monopotassium phosphate, however, is acidic (pH of 1% solution is 4.6), and therefore is less likely to adversely affect the soil acidity.

In order to provide sufficient nutrients in one application, the fertilizer should have a high analysis formulation with a low "burn" potential. Further, to decrease bulk weight and increase fluid applications, the fertilizer, in accordance with certain aspects of the invention, may be substantially free of fillers and binding agents. Therefore, one part of the monopotassium phosphate in granular or other form may be combined with four parts of a 2:1 slow to fast release ureaformaldehyde in powder form and blended together with from about 0.25 to 2.5% of a polyamino acid to form a homogeneous mixture. A resultant fertilizer analysis of about (30-10-7) is achieved using four parts of a ureaformaldehyde (38-0-0), blended with one part of monopotassium phosphate (0-52-35) and a beneficial amount of a polyamino acid. The actual nutrient percentage of the final (30-10-7) composition is generally 47% (30+10+7) of the total weight. Deviations or limitations on this percentage are regulated by the agriculture laws of various political jurisdictions. In Ohio, the Ohio Fertilizer Law, Regulation AG-61-01.06 allows an analytical tolerance of 97%. Thus, the total nutrient value cannot be less than 97% of the 47% fertilizer formulation, or 45.59% nutrients. On an individual basis, the percentage of the total nitrogen, phosphorus or potassium may not vary more than 10% or below 2 percentage points below the guaranteed analysis, whichever is smaller. For instance, for the (30-10-7), the nitrogen may vary to 28%, as the 2 percentage points is less than 10% of 30 or 3%. However, a deviation of 2% would alter the total nutrients to a value less than the allowed 97% of total nutrients. For phosphorus and potassium, the percentage would be governed by the 10% deviation in the actual analysis which would be less than a 2% percentage point deviation in the analysis and therefore could be as low as 9.0 for phosphorus expressed as $P_2O_5$ and 6.3% for potash expressed as $K_2O$.

Again, the ratio of slow to fast release nitrogen may be effectively varied in the final composition by selecting a formulation of ureaformaldehyde having varied ratios of methylene ureas to unreacted ureas.

The previous example reflects approximately the 3:1:1 ideal fertilization ratio of nutrients desired for tree growth and nourishment using a (0-52-35) monopotassium phosphate. In order to further adjust the weight percent of potassium relative to the phosphorus, additional potassium compounds may be added, however, such additions increase the salt index of the resultant fertilizer and therefore is not desirable. Thus, in accordance with this example, the actual ratio is generally about 3:1:less than 1.

In developing the aforementioned example, the nitrogen source was available as ureaformaldehyde (38-0-0) or 38% nitrogen per 100 lbs. (45.36 kgs) and the monopotassium phosphate was available in a (0-52-35) or 52% phosphorus expressed as $P_2O_5$ and 35% soluble potash expressed as $K_2O$ per 100 lbs. (45.36 kgs) of the blend. When adding the nitrogen and monopotassium phosphate sources, it is apparent that in order to achieve the approximate 3:1:1 ratio, 4 parts of the (38-0-0) or 400 lbs. (181.44 kgs) of the ureaformaldehyde should be uniformly blended with one part or 100 lbs. (45.36 kgs) of the monopotassium phosphate to get a 500 lb. (226.80 kgs) (152-52-35) blend or approximately (30-10-7) per 100 lbs. (45.36 kgs) of blended fertilizer.

Although this approximate 3:1:1 ratio reflected by the (30-10-7) blend is preferred, it has now been determined that slight variations of the nutrients N, P and K could be made without significantly altering the percent of each ingredient per 100 lbs. (45.36 kgs) and thus could be acceptable when used for similar applications. Specifically, suppose that only 300 lbs. (136.08 kgs) of the nitrogen source (38-0-0) were blended with 100 lbs. (45.36 kgs) of the monopotassium phosphate (0-52-35). The resultant blend would be a 400 lb. (180.44 kgs) (114-52-35) equivalent to a (28-13-9) blend per 100 lbs. (45.36 kgs). It can be seen that the (28-13-9) formulation does not vary greatly from the (30-10-7) preferred blend and in practice would be an acceptable fertilizer blend for many applications.

Likewise, if 200 lbs. (90.72 kgs) of the nitrogen source were used or blended with 100 lbs. (45.36 kgs) of the monopotassium phosphate, the resultant 300 lbs. (136.08 kgs) blend would be a (76-52-35) which is equivalent to a (25-17-12) based or 100 lbs. (45.36 kgs). Again the (25-17-12) formulation would appear to exhibit similar characteristics of the (30-10-7) formulation, although the degree of variation has almost become too significant to achieve the desired nutrient application and thus this formulation would not be as desirable for widespread application.

The two foregoing examples have reflected some possible acceptable deviations from the preferred 3:1:1 ratio of N:P:K discussed above when lesser amounts of nitrogen were added. Similarly, an increased amount of nitrogen could result in an acceptable formulation.

For example, if 500 lbs. (226.80 kgs) of the (38-0-0) nitrogen source were added or blended with the 100 lbs. (45.36 kgs) of the (0-52-35) monopotassium phosphate source, the resultant blend would be a (190-52-35) blend based on 600 lbs. (272.16 kgs) or equivalent to a (32-9-6) fertilizer based on 100 lbs. (45.36 kgs). Again, this formulation would be similar to the (30-10-7) preferred example in providing an acceptable nutrient supply source for general applications.

It should be noted that the same deviations in the actual percentages of the various final compositions of the foregoing examples may be acceptably varied within ranges as discussed above, dependent upon local regulations. Thus each fertilizer formulation should be understood to be alterable within the limits defined by law.

In addition to the acceptable degree of variation in the ratio of nitrogen nutrients to the inorganic nutrients as defined by law, the commercially available sources of monopotassium phosphate or nitrogen compound may also vary. That is, the (0-52-35) monopotassium phosphate is a commercially available food grade monopotassium phosphate. Another currently available monopotassium phosphate source is a (0-47-31) monopotassium phosphate. Further the ureaformaldehyde source may also vary from the preferred (38-0-0) depending upon commercially available sources.

In view of the foregoing, it can be seen that by varying the ratio of the nitrogen releasing source to the monopotassium phosphate between 2 to 5:1 respectively, and dependent upon the nitrogen and monopotassium phosphate source, various high analysis fertilizers may be blended to have a resultant nutrient percentage per 100 lbs. of weight in the range of approximately 25 to 32% nitrogen; 17 to 8% phosphorus; 12 to 5% potassium and 0.25 to 2.5% polyamino acid. The resultant fertilizers, and especially those utilizing a 3 to 5:1 ratio of nitrogen releasing component to monopotassium phosphate, respectively, are particularly suitable for application to trees to provide the necessary nutrient value without causing root burn or otherwise adversely affecting the acidity of the soil surrounding the plant root system.

As discussed above, in order to facilitate the dispensing of the fertilizer product when used in a conventional sprayer or injector, it is desirable that the organic material pass an 40-mesh sieve as the insoluble portions thereof will be suspended in a liquid solution when mixed with water for use. Because the monopotassium phosphate and polyamino acid are soluble and will therefore form a liquid when mixed with water, there need not be any specific size requirement with regard thereto; although a generally fine to granular size is preferred to insure a more homogeneous mixture. Nonetheless, the monopotassium phosphate granules are preferably compatible in weight and size with powdered ureaformaldehyde in order to blend properly and remain homogeneous during shipping and handling.

Blending of the organic synthetic material and the inorganic material is complicated by the fact that ureaformaldehyde of the size required tends to flow or separate from the larger inorganic material when mixed by fertilizer blending equipment. However, by utilizing a curved bladed rotary type bulk mixer which operates in much the same manner as a cement mixer, the monopotassium phosphate and ureaformaldehyde were blended in a homogeneous mixture using the above compound ratios. Further, the resultant fertilizer blend remained thoroughly mixed even after shipping and handling.

Amino acids are extremely hygroscopic, which can cause problems in a dry-blending process. It has been found that the amino acid biopolymer, such as Amisorb® can be blended with the remaining components of the fertilizer compositions described herein to protect the amino acid from moisture. Therefore, in accordance with one aspect of the invention, a preblend can be prepared comprising polyamino acid and a portion of the remaining formulation. In particular, the polyamino acid can be blended with powdered ureaformaldehyde to produce a preblend that can be used in subsequent compounding operations.

In use, the high analysis fertilizer compositions of ureaformaldehyde, monopotassium phosphate and a polyamino acid are mixed as described above and shipped to various supply outlets and/or potential users in dry form, thus simplifying product handling and storage as well as reducing the shipping weight. When it is desired to use the product, it can be mixed with varying quantities of water depending upon the type of application. Fertilizer strengths which are equivalent to six pounds of nitrogen to each thousand square feet have been safely applied to lawn areas and trees without causing any plant or root burn.

Further, due to the fact that the insoluble ureaformaldehyde particles which are suspended in solution when the fertilizer is mixed with water are so small, the fertilizer may be applied to surface or subsurface areas utilizing sprayers and pressure or hydraulic injection equipment without clogging equipment valves and nozzles.

While representative of the present invention, the following examples are not intended to limit the scope of the invention in any way.

EXAMPLES

One-year-old red maple (*Acer rubrum*) seedlings were planted in 5-gallon containers using screened topsoil as the planting media. The 90 trees were weighed prior to planting and had an average weight of 23 grams at the time of plotting. The sandy loam topsoil used in the containers had a pH of 7.4, soluble salts of 0.15 and 2 ppm of Nitrate N prior to fertilization.

Nine treatments applied included combinations of Arbor Green (a 30-10-7 slow release fertilizer), two sources of organic matter (humate and kelp) and an amino acid. The source of humate is oxidized lignite in New Mexico and is available from Mesa Verde Resources. The product, ground to a 50 mesh, is 70% humate with an analysis of 60% humic acid and 30% fulvic acid. The source of kelp is *Ascophyllum nodosum* beds in the North Atlantic. The product, ground to a 60 mesh, is available from Acadian Seaplants, Ltd. Polyaspartic acid is manufactured by Donlar Corporation as a 40% active liquid or a spray-dried concentrate and sold under the trade name, Amisorb®, the sodium salt of polyaspartate. (See Table 1 below.) The surface area of each container was 10.75 inches in diameter or 0.6 sq. ft. per pot. The study was conducted using a randomized complete block design with 10 replications per treatment.

TABLE 1

| No. | Type | Treatment | Components: | % of Blend | Rate Lb. Nitrogen/ 1,000 sq. ft | Replicates |
|---|---|---|---|---|---|---|
| 1 | Comparative | 30-10-7 (Arbor Green) | UF<br>MKP | 80<br>20 | 6 | 10 |
| 2 | Comparative | 26-10-7 | UF<br>MKP<br>Humate<br>Kelp | 69.5<br>20.5<br>6<br>4 | 6 | 10 |
| 3 | Comparative | 26-10-7 | UF<br>MKP<br>Humate | 69.5<br>20.5<br>6 | 3 | 10 |
| 4 | Inventive | 26-10-7 | UF<br>MKP<br>Humate<br>Amisorb® | 69.5<br>20.5<br>9.5<br>0.5 | 6 | 10 |
| 5 | Inventive | 26-10-7 | UF<br>MKP<br>Humate<br>Amisorb® | 69.5<br>20.5<br>9.5<br>0.5 | 3 | 10 |
| 6 | Inventive | 26-10-7 | UF<br>MKP<br>Humate<br>Kelp<br>Amisorb® | 69.5<br>20.5<br>6<br>3.5<br>0.5 | 6 | 10 |
| 7 | Inventive | 26-10-7 | UF<br>MKP<br>Humate<br>Kelp<br>Amisorb® | 69.5<br>20.5<br>6<br>3.5<br>0.5 | 3 | 10 |
| 8 | Inventive | 30-10-7 | UF<br>MKP<br>Amisorb® | 79.5<br>20<br>0.5 | 3 | 10 |
| 9 | Comparative | Control | | | | 10 |

UF = Ureaformaldehyde
MKP = Monopotassium Phosphate

Treatment responses were evaluated using growth, visual rating and color.

Growth was evaluated by carefully washing the soil from the root systems of the trees and calculating the percent increase in total weight during the test period.

Visual Rating was evaluated using a scale of 0-5 where 5=excellent and 0=dead.

Color was evaluated using a Minolta SPAD-502 Chlorophyll Meter that assigns a numerical number to the green color in leaves.

RESULTS

Color evaluations were conducted initially and after about 3 months. There were no significant differences among treatments when color was compared.

When rating was evaluated visually using a scale of 0-5, two treatments had significantly higher ratings than the untreated trees. Both of the top two treatments that out-preformed the untreated trees included the essential amino acid, polyaspartic acid.

When growth was evaluated by calculating the percent increase in weight during the test period, three of the treatments had significantly more growth than the untreated trees. All of these treatments also contained the essential amino acid, polyaspartic acid.

TABLE 2

| No. | Treatment | Rating | | percent wt. gain | |
|---|---|---|---|---|---|
| 1 | Arbor Green 6# | 2.9 | abc | 95.56 | bc |
| 2 | 26-10-7 + Humate + Kelp 6# | 2.2 | bc | 102.69 | bc |
| 3 | 26-10-7 + Humate + Kelp 3# | 2.4 | bc | 75.467 | c |
| 4 | 26-10-7Humate + Amisorb ® 6# | 2.4 | bc | 138.43 | abc |
| 5 | 26-10-7Humate + Amisorb ® 3# | 3.4 | ab | 103.02 | bc |
| 6 | 26107Humate Amisorb ® Kelp6# | 3 | abc | 149.25 | ab |
| 7 | 26-10-7Humate Amisorb ® Kelp3# | 2.9 | abc | 144.844 | ab |
| 8 | Arbor Green + Amisorb ® | 3.8 | a | 168.656 | a |
| 9 | Control | 1.8 | c | 76.07 | c |

Means followed by same letter do not significantly differ (P = .05, Duncan's New MRT)

Means followed by same letter do not significantly differ (P=0.05, Duncan's New MRT)

What is claimed is:

1. A method for enhancing uptake of the nutrients N, P and K in woody perennials comprising:
   a) providing a dry high analysis fertilizer composition comprising ureaformaldehyde, monopotassium phosphate and potassium polyaspartate wherein the effective percentages of the nutrients N, P and K are present in the ranges between about 25% to 32% for nitrogen, about 17% to 8% phosphorus expressed as $P_2O_5$, and about 12% to 5% soluble potash expressed as $K_2O$; and
   b) treating a woody perennial with the fertilizer composition.

2. The method of claim 1 wherein said composition comprises from about 0.25% to about 2.5% by weight potassium polyaspartate.

3. The method of claim 2 wherein said composition comprises from about 0.3% to about 1.0% potassium polyaspartate.

4. The method of claim 1 wherein said ratio of N, P and K is approximately 3:1:1.

5. The method of claim 1 wherein said step of providing a dry high analysis fertilizer composition comprises: preparing a preblend of ureaformaldehyde and potassium polyaspartate.

6. The method of claim 1 wherein said fertilizer composition has a salt index of less than 10.

* * * * *